(12) United States Patent
Yang et al.

(10) Patent No.: US 12,476,578 B2
(45) Date of Patent: Nov. 18, 2025

(54) PHOTOVOLTAIC TRACKING METHOD AND APPARATUS, TRACKING CONTROLLER AND PHOTOVOLTAIC TRACKING SYSTEM

(71) Applicant: Sungrow Renewables Development Co., Ltd., Hefei (CN)

(72) Inventors: Zongjun Yang, Hefei (CN); Fan Li, Hefei (CN); Pengpeng Chen, Hefei (CN); Jiansheng Lu, Hefei (CN)

(73) Assignee: Sungrow Renewables Development Co., Ltd., Hefei (CN)

( * ) Notice: Subject to any disclaimer, the term of this patent is extended or adjusted under 35 U.S.C. 154(b) by 0 days.

(21) Appl. No.: 18/577,796

(22) PCT Filed: Apr. 26, 2022

(86) PCT No.: PCT/CN2022/089160
§ 371 (c)(1),
(2) Date: Jan. 9, 2024

(87) PCT Pub. No.: WO2023/035625
PCT Pub. Date: Mar. 16, 2023

(65) Prior Publication Data
US 2024/0348196 A1 Oct. 17, 2024

(30) Foreign Application Priority Data
Sep. 8, 2021 (CN) .......................... 202111049082.5

(51) Int. Cl.
*H02S 20/32* (2014.01)
*F24S 50/20* (2018.01)
*G05D 3/12* (2006.01)

(52) U.S. Cl.
CPC .............. *H02S 20/32* (2014.12); *F24S 50/20* (2018.05); *G05D 3/12* (2013.01)

(58) Field of Classification Search
CPC ................................................. H02S 20/30–32
(Continued)

(56) References Cited

U.S. PATENT DOCUMENTS

2009/0050192 A1  2/2009  Tanaka et al.

FOREIGN PATENT DOCUMENTS

CN    106877803 A    6/2017
CN    206620088 U    11/2017
(Continued)

OTHER PUBLICATIONS

CN-107885237-A English (Year: 2018).*
(Continued)

*Primary Examiner* — Bach T Dinh
(74) *Attorney, Agent, or Firm* — Wolf, Greenfield & Sacks, P.C.

(57) ABSTRACT

A photovoltaic tracking method and apparatus, a tracking controller and a photovoltaic tracking system. The method includes: determining an advance adjustment time instant between a previous preset adjustment time instant and a next preset adjustment time instant; obtaining a target tracking angle of a tracking bracket corresponding to the next preset adjustment time instant; and adjusting an angle of the tracking bracket to the target tracking angle in a case that a current time instant is the advance adjustment time instant, wherein the angle of the tracking bracket remains unadjusted at the previous preset adjustment time instant and the next preset adjustment time instant. In this application, the power generation of the photovoltaic module is increased in the time period from the previous preset adjustment time instant to the next preset adjustment time instant, thereby reducing the power loss of the photovoltaic power generation.

10 Claims, 7 Drawing Sheets

(58) Field of Classification Search
USPC .................................................. 136/243–265
See application file for complete search history.

(56) References Cited

FOREIGN PATENT DOCUMENTS

| | | | | | |
|---|---|---|---|---|---|
| CN | 107885237 | A | * | 4/2018 | ............... G05D 3/12 |
| CN | 207689922 | U | | 8/2018 | |
| CN | 108563245 | A | | 9/2018 | |
| CN | 109343575 | A | | 2/2019 | |
| CN | 110289805 | A | | 9/2019 | |
| CN | 113075940 | A | * | 7/2021 | ............... G05D 3/12 |
| CN | 113625785 | A | | 11/2021 | |
| JP | 2015-090911 | A | | 5/2015 | |
| KR | 100440221 | B1 | | 7/2004 | |
| WO | WO 2011/134058 | A1 | | 11/2011 | |

OTHER PUBLICATIONS

CN-113075940-A (Year: 2021).*
First Office Action for Chinese Application No. 202111049082.5, dated Oct. 28, 2023.
International Search Report and Written Opinion for International Application No. PCT/CN2022/089160, mailed Aug. 3, 2022.

* cited by examiner

US 12,476,578 B2

PHOTOVOLTAIC TRACKING METHOD AND APPARATUS, TRACKING CONTROLLER AND PHOTOVOLTAIC TRACKING SYSTEM

CROSS REFERENCE OF RELATED APPLICATION

This application is a national stage filing under 35 U.S.C. § 371 of International Patent Application Serial No. PCT/CN2022/089160, filed Apr. 26, 2022, which claims priority to Chinese Patent Application No. 202111049082.5 titled "PHOTOVOLTAIC TRACKING METHOD AND APPARATUS, TRACKING CONTROLLER AND PHOTOVOLTAIC TRACKING SYSTEM", filed on Sep. 8, 2021 with the China National Intellectual Property Administration (CNIPA). The contents of these applications are incorporated herein by reference in their entirety.

FIELD

The present disclosure relates to the field of photovoltaic tracking, and in particular to a photovoltaic tracking method and an apparatus, a tracking controller, and a photovoltaic tracking system.

BACKGROUND

A power generation efficiency of a photovoltaic module installed on a tracking bracket is related to an irradiation angle of a solar ray. When the solar ray irradiates vertically on a surface of the photovoltaic module, the photovoltaic module receives the maximum amount of solar energy, resulting in the highest power generation efficiency.

In practice, a tracking controller controls an actuator to adjust an angle of the tracking bracket, so that the surface of the photovoltaic module is perpendicular to a direction of the solar ray. The actuator adopts a step-by-step method. That is, the tracking controller controls the actuator to adjust the angle of the tracking bracket once at a preset adjustment time instant which is determined based on a designated time interval. Therefore, during a time period between two preset adjustment time instants, the surface of the photovoltaic module is not always perpendicular to the direction of the solar ray, which results in that the power generation efficiency of the photovoltaic module is not optimal, and leads to power loss of photovoltaic power generation.

In this case, the power loss can be reduced by reducing the designated time interval to increase the number of adjustments, which, however, will have an impact on the reliability of the actuator. Thus, how to reduce the power loss of photovoltaic power generation while keeping the original number of adjustments unchanged is a technical problem to be solved by those skilled in the art.

SUMMARY

In view of this, the present disclosure provides a photovoltaic tracking method and an apparatus, a tracking controller and a photovoltaic tracking system, to solve the problem of reducing the power loss of photovoltaic power generation while keeping an original number of adjustments unchanged.

Technical solutions provided in the present disclosure for solving the above technical problems are described below.

A photovoltaic tracking method is provided. The method is applied to a tracking controller. The method includes: determining an advance adjustment time instant between a previous preset adjustment time instant and a next preset adjustment time instant; obtaining a target tracking angle of a tracking bracket corresponding to the next preset adjustment time instant; and adjusting the angle of the tracking bracket to the target tracking angle in a case that a current time instant is the advance adjustment time instant, where the angle of the tracking bracket remains unadjusted at the previous preset adjustment time instant and the next preset adjustment time instant.

In an embodiment, the determining an advance adjustment time instant between a previous preset adjustment time instant and a next preset adjustment time instant includes: calculating a first total generated power in a target time period in a case that a tracking angle adjustment is performed at the previous preset adjustment time instant and the next preset adjustment time instant, respectively, where the target time period is a time period from the previous preset adjustment time instant and the next preset adjustment time instant; calculating a second total generated power in the target time period in a case that the tracking angle adjustment is performed at the advance adjustment time instant, rather than at the previous preset adjustment time instant or the next preset adjustment time instant; calculating a difference between the first total generated power and the second total generated power; and determining a time instant at which the difference is maximized to be the advance adjustment time instant.

In an embodiment, the determining an advance adjustment time instant between a previous preset adjustment time instant and a next preset adjustment time instant includes: randomly selecting a time instant between the previous preset adjustment time instant and the next preset adjustment time instant; and determining the selected time instant to be the advance adjustment time instant.

In an embodiment, the determining an advance adjustment time instant between a previous preset adjustment time instant and a next preset adjustment time instant includes: determining an intermediate time instant between the previous preset adjustment time instant and the next preset adjustment time instant to be the advance adjustment time instant.

In an embodiment, the determining an advance adjustment time instant between a previous preset adjustment time instant and a next preset adjustment time instant includes: determining an advance time interval based on the previous preset adjustment time instant and the next preset adjustment time instant; and calculating the advance adjustment time instant based on the advance time interval and one of the previous preset adjustment time instant and the next preset adjustment time instant.

In an embodiment, the determining an advance adjustment time instant between a previous preset adjustment time instant and a next preset adjustment time instant includes: obtaining a tracking mode of a photovoltaic tracking system and the current time instant; and in a case that the tracking mode is a normal tracking mode and the current time instant is within a preset time period, when determining that the current time instant is between the previous preset adjustment time instant and the next preset adjustment time instant, determining the current time instant between the previous preset adjustment time instant and the next preset adjustment time instant to be the advance adjustment time instant.

In an embodiment, the obtaining a target tracking angle of a tracking bracket corresponding to the next preset adjustment time instant includes: obtaining a predetermined correlation between a preset adjustment time instant and a tracking angle of the tracking bracket; querying, from the predetermined correlation, a tracking angle corresponding to the next preset adjustment time instant; and determining said tracking angle to be the target tracking angle.

In an embodiment, the adjusting the angle of the tracking bracket to the target tracking angle includes: outputting an angle adjustment instruction comprising the target tracking angle to an actuator; and controlling the actuator to adjust the angle of the tracking bracket to the target tracking angle.

A photovoltaic tracking apparatus is provided. The apparatus is applied to a tracking controller. The apparatus includes: a time instant determination module, configured to determine an advance adjustment time instant between a previous preset adjustment time instant and a next preset adjustment time instant; an angle obtaining module, configured to obtain a target tracking angle of a tracking bracket corresponding to the next preset adjustment time instant; and an angle adjustment module, configured to adjust the angle of the tracking bracket to the target tracking angle in a case that a current time instant is the advance adjustment time instant, where the angle of the tracking bracket remains unadjusted at the previous preset adjustment time instant and the next preset adjustment time instant.

A tracking controller is provided, including a memory and a processor. The memory is configured to store a program. The processor is configured to call the program and perform the aforementioned photovoltaic tracking method.

A photovoltaic tracking system is provided, including at least one photovoltaic module, a photovoltaic inverter and the tracking controller as described above. The tracking controller is mechanically connected to the at least one photovoltaic module, and the at least one photovoltaic module is connected to a direct current side of the photovoltaic inverter.

Compared to conventional technology, beneficial effects of the present disclosure are described as follows.

The present disclosure provides a photovoltaic tracking method and an apparatus, a tracking controller, and a photovoltaic tracking system. In the present disclosure, the tracking controller does not adjust the angle of the tracking bracket at the previous preset adjustment time instant and the next preset adjustment time instant, but rather, adjusts the angle of the tracking bracket, at the advance adjustment time instant between the previous preset adjustment time instant and the next preset adjustment time instant, to the target tracking angle of the tracking bracket corresponding to the next preset adjustment time instant. Hence, during the time period from the previous preset adjustment time instant to the next preset adjustment time instant, a degree of sudden change in the power generation of the photovoltaic module is reduced, and continuity of the change in power generation is improved. Compared to adjusting the tracking angle at each preset adjustment time instant to cause the sudden change in the power generation of the photovoltaic module, the method of the present disclosure can increase the power generation of the photovoltaic module in the time period from the previous preset adjustment time instant to the next preset adjustment time instant, thereby reducing the power loss of the photovoltaic power generation.

BRIEF DESCRIPTION OF THE DRAWINGS

For clearer illustration of the technical solutions according to embodiments of the present disclosure or conventional technology, hereinafter briefly described are the drawings to be applied in embodiments of the present disclosure or conventional technology. Apparently, the drawings in the following descriptions are only some embodiments of the present disclosure, and other drawings may be obtained by those skilled in the art based on the drawings without any creative effort.

DETAILED DESCRIPTION

Hereinafter technical solutions of embodiments of the present disclosure are described clearly and completely in conjunction with the drawings of the embodiments of the present disclosure. Apparently, the embodiments described below are only some embodiments, rather than all the embodiments of the present disclosure. Any other embodiments obtained by those skilled in the art based on the embodiments in the present disclosure without any creative effort shall fall within the protection scope of the present disclosure.

A power generation efficiency of a photovoltaic module installed on a tracking bracket is related to an irradiation angle of a solar ray. When the solar ray irradiates vertically on a surface of the photovoltaic module, the photovoltaic module receives the maximum amount of solar energy, resulting in the highest power generation efficiency. For example, in a single-axis photovoltaic tracking system, a tracking controller calculates a solar azimuth through analysis on meteorological data to derive an angular distribution at different time instants, and then controls an actuator to adjust a tracking bracket (the module is mounted on the tracking bracket). In this way, a complementary relationship is maintained between a surface of the module and the solar azimuth (that is, the surface of the module is perpendicular to a direction of a solar ray).

As the actuator is a mechanical structure, there may be an error in terms of precision of the control. Therefore, a stepless speed regulation cannot be actually realized. The regulation is actually in a manner of stepping, in which the regulation is performed about every 5 to 10 minutes, depending on different time periods. That is, on a small time-scale, the surface of the module is not always perpendicular to the direction of the solar ray.

Figure 1:
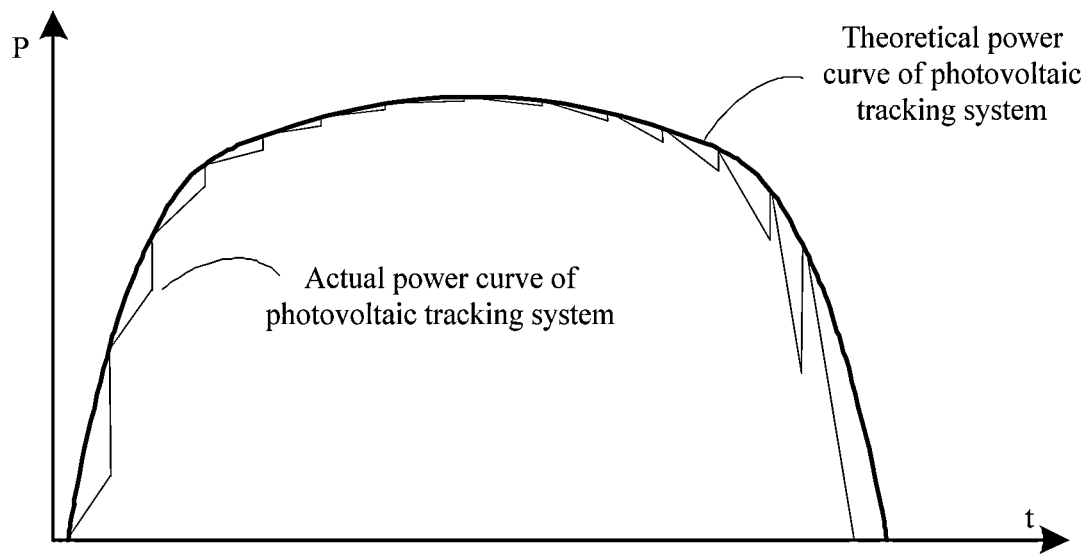
FIG. 1 is a comparative power curve according to an embodiment of the present disclosure.

Reference is made to FIG. 1, which shows a power curve of a photovoltaic tracking system. In FIG. 1, a thick line represents a theoretical power curve of the photovoltaic tracking system. Since a tracker acts in a stepping manner, an actual tracking curve of the photovoltaic tracking system is a folded path and lies inside a theoretical power curve. In each action of the tracking controller, it is only ensured that a power at a certain time instant is consistent with a theoretical maximum power, and the power at other time instants is reduced in relative to the theoretical power (that is, the angle deviates from an optimal position). In this case, an area enclosed by the two curves represents a current power loss of the tracker.

In order to solve the problem of power loss, the actual power can be controlled to approximate the theoretical power by reducing a step magnitude and increasing the number of adjustments. However, such method results in a higher requirement to the photovoltaic tracking system and reduced reliability of the actuator, thereby, effecting a cost and mechanical reliability of the photovoltaic tracking system. Therefore, it is necessary to reduce the loss of power generation caused by tracking and improve the profit of power generation without increasing the number of adjustments.

To this end, it is found through research that an adjusted angle of the photovoltaic module at each preset adjustment time instant can be calculated through a conventional method. At each adjustment, the adjustment of the tracking angle is not performed at the preset adjustment time instant, but at a time instant which is $\Delta t$ in advance to the preset adjustment time instant, so that the photovoltaic module arrives in advance at a new posture which is set for the next time instant. Hence, the power loss during tracking is reduced and capacity of the power generation is improved.

According to the embodiment of the present disclosure, the tracking controller does not adjust the angle of the tracking bracket at the previous preset adjustment time instant and the next preset adjustment time instant, but rather, adjusts the angle of the tracking bracket, at the advance adjustment time instant between the previous preset adjustment time instant and the next preset adjustment time instant, to the target tracking angle of the tracking bracket corresponding to the next preset adjustment time instant. Hence, during the time period from the previous preset adjustment time instant to the next preset adjustment time instant, a degree of sudden change in the power generation of the photovoltaic module is reduced, and continuity of the change in power generation is improved. Compared to adjusting the tracking angle at each preset adjustment time instant to cause the sudden change in the power generation of the photovoltaic module, the method of the present disclosure can increase the power generation of the photovoltaic module in the time period from the previous preset adjustment time instant to the next preset adjustment time instant, thereby reducing the power loss of the photovoltaic power generation.

Figure 2:
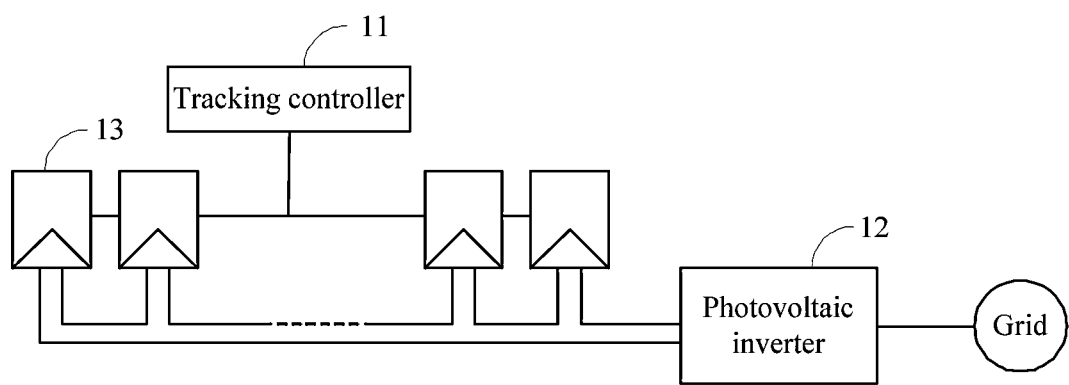
FIG. 2 is a schematic structural diagram of a photovoltaic tracking system according to an embodiment of the present disclosure.

Based on the above embodiment, a photovoltaic tracking method is provided according to an embodiment of the present disclosure. The method is applied to a tracking controller in a photovoltaic tracking system. Reference is made to FIG. 2. The photovoltaic tracking system includes a tracking controller 11, a photovoltaic inverter (direct current/alternating current, DC/AC) 12 and a photovoltaic module 13.

The tracking controller 11 is connected to at least one photovoltaic module 13 through a mechanical structure, and is configured to automatically adjust an angle of the photovoltaic module 13 to change radiation received by a surface of the photovoltaic module 13. The tracking controller 11 includes a control unit, which is configured to collect and calculate a solar azimuth, and issuing an instruction for controlling a tracking angle to an adjustment mechanism of the actuator.

In a case that multiple photovoltaic modules 13 form a photovoltaic array, the tracking controller 11 is connected to the photovoltaic array through a mechanical structure. In a case of multiple photovoltaic arrays, the photovoltaic arrays are electrically connected with each other, and the tracking controller 11 may automatically adjust an angle of each of the photovoltaic arrays to change the radiation received by the surface of the photovoltaic module in each photovoltaic array.

A direct current side of the photovoltaic inverter 12 is connected to at least one photovoltaic module 13. In a case of multiple photovoltaic modules 13, electrically connected photovoltaic modules 13 are connected in series to form a photovoltaic string, and the photovoltaic string is connected in parallel to the DC side of the photovoltaic inverter 12. An output terminal of the photovoltaic inverter 12 is connected to a power grid.

Under a normal condition, the photovoltaic inverter 13 operates in an MPPT (Maximum Power Point Tracking) state, and the tracking controller 11 automatically tracks a maximum irradiation. Thereby, a photovoltaic power station outputs at a maximum power.

Based on the structure of the photovoltaic tracking system, the photovoltaic tracking method according to the present disclosure is applied to the tracking controller 11. The tracking controller 11 performs angle adjustment at a time instant which is $\Delta t$ in advance to the preset adjustment time instant. A specific working principle is described below.

Figure 3:
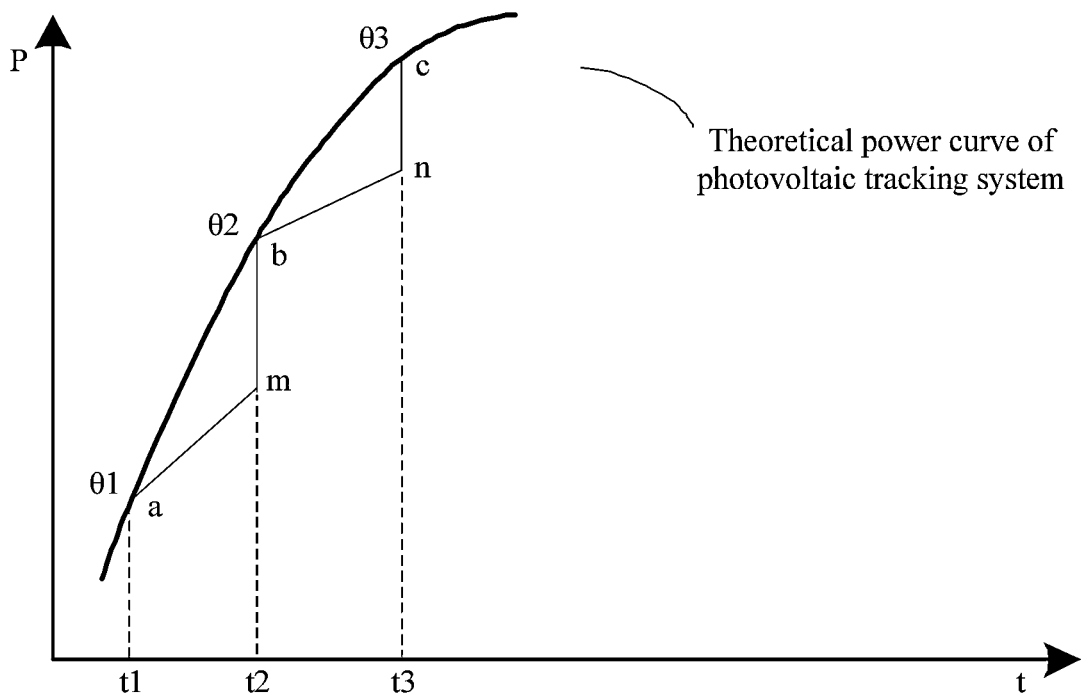
FIG. 3 shows a schematic diagram of a scenario of a power curve according to an embodiment of the present disclosure.

FIG. 3 shows an example of a detailed process of a conventional tracking strategy. Assuming that the tracking controller in the photovoltaic tracking system determines a solar azimuth $\theta 1$ at time instant t1, it can be determined, based on a vertical relationship, that an adjusted angle of the tracking bracket is $(90°-\theta 1)$. At this time instant, the tracking controller adjusts the tracking bracket to the adjusted angle, the photovoltaic tracking system operates at power point a, and the generated power is consistent with a theoretical power, which is the largest in the current period. As time elapses, the photovoltaic tracking system remains stationary (does not perform adjustment) before a time instant t2 arrives, while the solar azimuth continues moving. Therefore, an actual power generation curve is lower than a theoretical curve. At the time instant t2, the tracking controller obtains a solar azimuth $\theta 2$, and similarly, the angle of the tracking bracket is adjusted to $(90°-\theta 2)$. Hence, the power is adjusted from point m to point b, so that the photovoltaic tracking system enters a new state having a transient maximum power generation. It should be noted that the conversion of the angle from $\theta 1$ to $\theta 2$ at this time instant causes a sudden change in the power from Pm to Pb. A process of power change is a-m-b. Based on such logic, a series of subsequent repeated actions can be obtained, forming a continuous polyline curve as shown in FIG. 1.

In this process, it can be seen that the adjustment of the photovoltaic tracking system is always lagged behind the changes in the solar azimuth. The power curve extends along the path passing a-m-b. During a time period $\Delta t$ (t2−t1) in which the tracking controller remains stationary, there is a loss in power generation, which is represented as an area enclosed by the curve and polyline in the FIG. 3.

Figure 4:
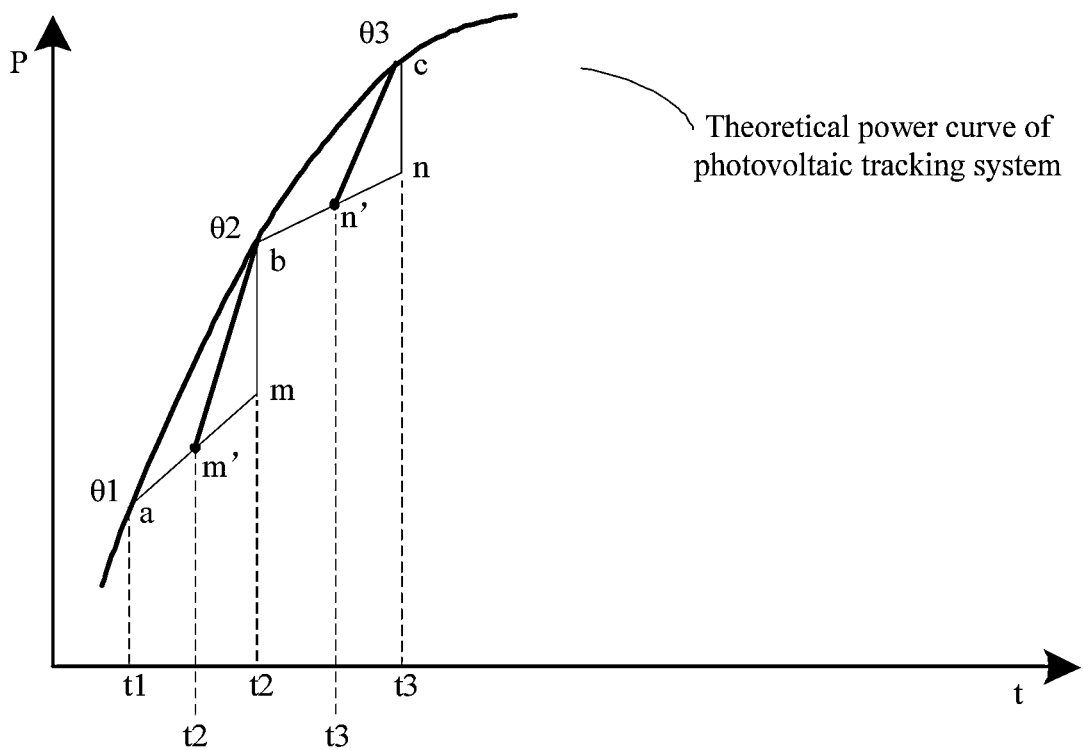
FIG. 4 shows a schematic diagram of a scenario of a power curve according to another embodiment of the present disclosure.

In order to reduce the power loss, the original control strategy is improved, and details of which can be seen from FIG. 4. In the improved strategy, the solar azimuth is calculated through the conventional method, but the tracking controller acts at an advanced time instant. Specifically, the adjustment is not performed at time instants t1, t2, or t3 in FIG. 3, but at a time instant between t1 and t2, that is, at a time instant t2' before t2. Further, the adjustment is performed at a time instant between t2 and t3, that is, at a time instant t3' before t3.

In an example, it is assumed that at time instant t1, the azimuth is θ1, and the photovoltaic tracking system operates at the maximum power point a. As time elapses, at time instant t2', (t2'<t2), the power runs at a position m'. At this time instant, an azimuth θ2 for the next time instant t2 is obtained, and the angle of the tracking bracket is calculated and adjusted in advance to (90°−θ2). In other words, the conventional solution is to adjust the angle at time instant t2, while the provided solution in the present disclosure is to adjust the angle, in advance, at time instant t2'.

Since the angle is adjusted in advance, it is equivalent to that a vertical angle of the surface of the photovoltaic module exceeds a theoretical optimal vertical angle at present, waiting for an arrival of the solar azimuth. Since the power is basically unchanged before and after the adjustment (which is equivalent to moving the photovoltaic module from the left side of the vertical position of the sun to the right side of the vertical position, where the left side and the right side and the solar azimuth are in a mirror relationship, and therefore the power of the photovoltaic module is basically unchanged), the power after the adjustment is still near point m'. As time arrives at time instant t2, the solar azimuth slowly moves to be perpendicular to the surface of the photovoltaic module, and thereby the power is maximum, that is, at the point b. Then, the solar azimuth exceeds the currently set angle, and the actual power starts to become lower than the theoretical power, that is, fails to track the solar azimuth and extends along bn'. The above process repeats.

During this process, the actual calculated azimuth is not changed, which is still θ1, θ2 . . . , as original, but the time instant for the adjustment is advanced. The adjustment to a new angle is performed in advance before the optimal vertical time instant for the sun arrives. In this way, the new actual power curve extends along a-m'-b, instead of a-m-b. It can be seen from FIG. 4 that an area representing the power loss, enclosed by the new power curve and the theoretical power curve, is smaller than the area representing the power loss according to the conventional method (FIG. 3), that is, S (am'b)<S (amb). Apparently, the embodiment of the present disclosure realizes a reduced power loss and an improved power generation.

In the conventional method, the azimuth θ2 is maintained during a time interval [t2−t3]. In an embodiment of the present disclosure, the azimuth θ2 is maintained during a time interval [t2'−t3']. It can be seen that, a time interval for adjustment remains unchanged, and the number of adjustments is not increased. That is, in the embodiment of the present disclosure, the effect of reducing the power loss without changing the number of adjustments is achieved.

Figure 5:
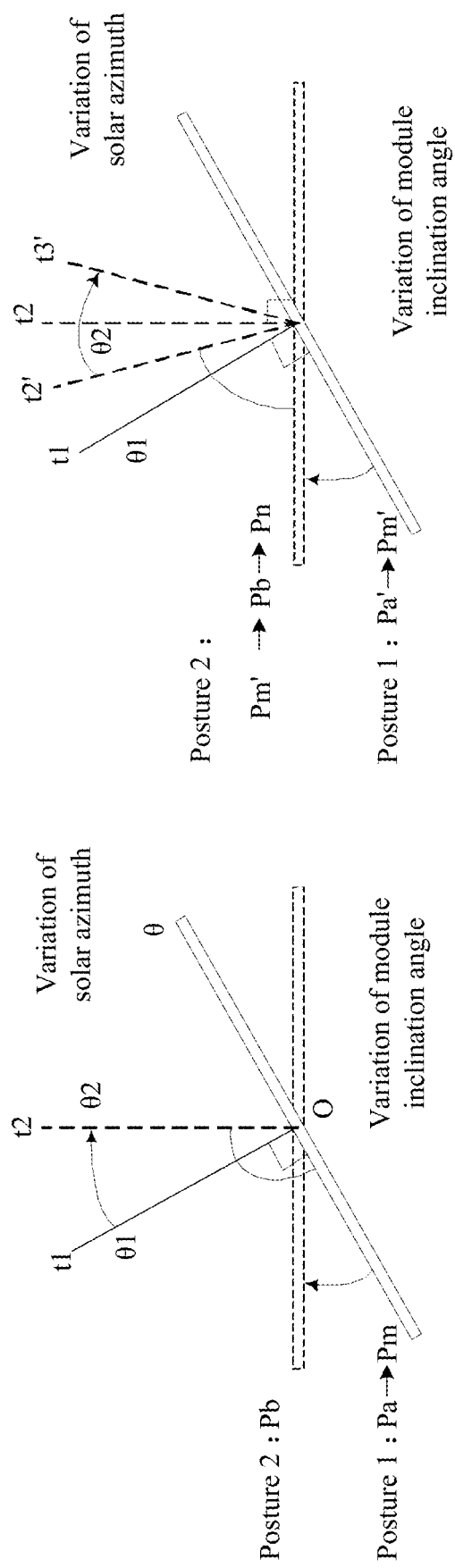
FIG. 5 shows a relationship between a photovoltaic module and a solar azimuth according to an embodiment of the present disclosure.

In order to explain the above process more clearly, reference may be made to FIG. 5, which further explain the adjustment process and power changes from the perspective of the photovoltaic module. FIG. 5 shows a relationship between a photovoltaic module and a solar azimuth.

The left-side diagram in FIG. 5 shows a conventional mode. At time instant t1, the solar azimuth is θ1 and is perpendicular to the photovoltaic module. As the solar azimuth changes to θ2, the photovoltaic module is not adjusted and the power generation of the photovoltaic module changes from Pa to Pm. Finally, at time instant t2, the power generation of the photovoltaic module is adjusted to Pb. A power in the time interval from t1 to t2 may be approximately calculated as an integral of an average of Pa and Pm on time:

$$W1 = \int_{t1}^{t2} \frac{1}{2}(Pa + Pm)dt.$$

The right-side diagram in FIG. 5 shows the control strategy according to an embodiment of the present disclosure. At time instant t1, the solar azimuth is θ1 and is perpendicular to the photovoltaic module. As the solar azimuth changes to the time instant t2', before the time instant t2, the angle of the photovoltaic module is adjusted to (90°−θ2) in advance. Hence, the photovoltaic module is positioned at an angle ahead of the solar azimuth, and the power of the photovoltaic module is adjusted from Pa to Pm'. As the solar passes through the time period [t2'−t2−t3'], the power of the photovoltaic module changes from Pm' to Pb and then to Pn. When mapping to the time interval [t1−t2], the power in this time interval according to the control strategy in the embodiment may be approximately calculated as:

$$W2 = \int_{t1}^{t2'} [\frac{1}{2}(Pa + Pm')dt + \int_{t2'}^{t2} \frac{1}{2}(Pm' + Pb)dt.$$

A subtraction of W1 from W2 obtains:

$$\Delta W =$$

$$W2 - W1 = \int_{t1}^{t2'} [\frac{1}{2}(Pa + Pm')dt + \int_{t2'}^{t2} \frac{1}{2}(Pm' + Pb)dt - \int_{t1}^{t2} \frac{1}{2}(Pa + Pm)dt =$$

$$\int_{t2'}^{t2} \frac{1}{2}(Pb - Pm)dt > 0.$$

It can be seen from the above that the control strategy in the present disclosure can increases the power generation.

Figure 6:
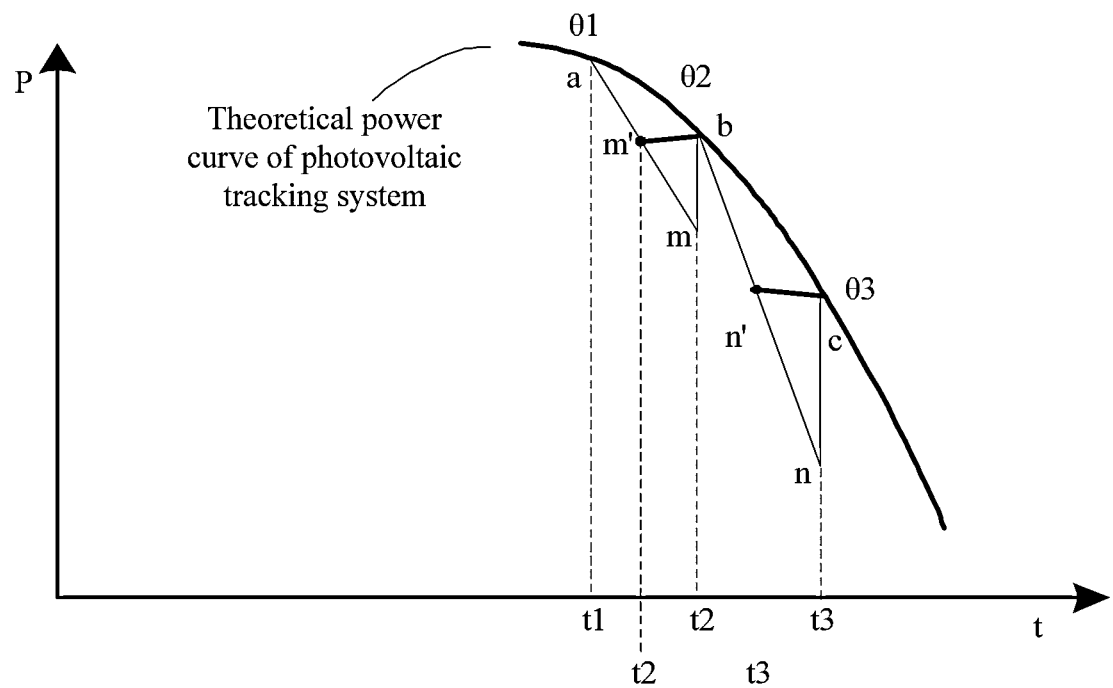
FIG. 6 shows a schematic diagram of a scenario of a power curve according to another embodiment of the present disclosure.

The above process provides analysis on tracking effects as the theoretical power increases. The control strategy is also applicable in a case that the theoretical power is in a downward trend. Reference may be made to FIG. 6 for a specific process thereof, which is not repeated here.

Figure 7:
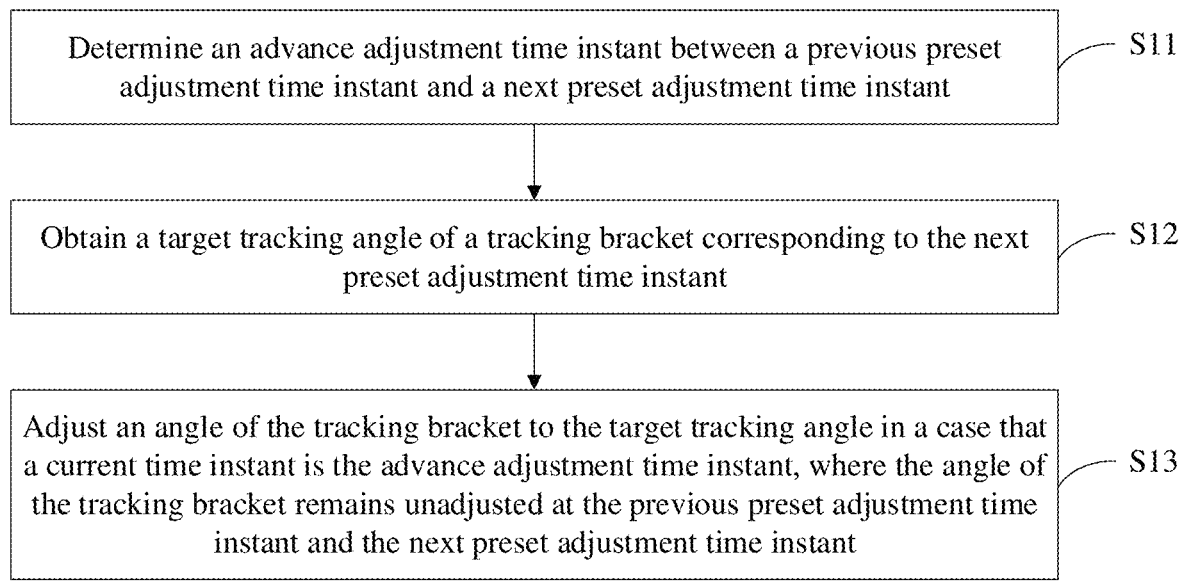
FIG. 7 is a flowchart of a photovoltaic tracking method according to an embodiment of the present disclosure.

The above embodiment provides a method of adjusting a tracking angle in advance, with which the power generation is improved and the power loss is reduced. In practice, how to determine the angle to be adjusted in advance is a technical problem to be solved by those skilled in the art. The photovoltaic tracking method provided in the present disclosure can be applied to solve this technical problem. Reference is made to FIG. 7. The method may include the following steps S11 to S13.

In step S11, an advance adjustment time instant between a previous preset adjustment time instant and a next preset adjustment time instant is determined.

In practice, the above-mentioned time instants t1 and t2 are referred to as preset adjustment time instants in this embodiment. A time instant in advance to the preset adjustment time instant, such as t2, is referred to as an advance adjustment time instant in this embodiment. In this embodiment, the advance adjustment time instant may be constant, or may be set based on an actual situation in each adjustment.

There is a prerequisite for determining the advance adjustment time instant. In an embodiment, the tracking controller needs to obtain a tracking mode of the photovoltaic tracking system and a current time instant. The photovoltaic tracking method according to the present disclosure is applicable in a case that the tracking mode is a normal tracking mode and the current time instant is within a time interval from 9:00 to 15:00.

In a case that the photovoltaic tracking system operates in a reverse tracking mode, the photovoltaic tracking method according to the present disclosure is not applicable.

In addition, the solution of determining an advance adjustment time instant according to the present disclosure may be performed in a case that the current time instant is not the preset adjustment time instant, but a time instant between the previous preset adjustment time instant and the next preset adjustment time instant, for example, between t1 and t2.

In another implementation of the present disclosure, various solutions for determining the advance adjustment time instant are provided, which are introduced as follows.

In a first solution, a time instant between the previous preset adjustment time instant and the next preset adjustment time instant is randomly selected and determined to be the advance adjustment time instant.

In this embodiment, a time instant between two preset adjustment time instants may be selected randomly and determined to be the advance adjustment time instant.

According to this solution, since the advance adjustment time instant is earlier than the next preset adjustment time instant, selecting any time instant between the previous preset adjustment time instant and the next preset adjustment time instant can achieve the purpose of increasing power generation and reducing power loss.

In a second solution, an intermediate time instant between the previous preset adjustment time instant and the next preset adjustment time instant is determined to be the advance adjustment time instant.

In this embodiment, the intermediate time instant between the two preset adjustment time instants may be determined to be the advance adjustment time instant, which is a special case based on the first solution. Such method is simple to implement and can achieve the purpose of increasing the power generation and reducing the power loss.

In a third solution, an advance time interval is determined based on the previous preset adjustment time instant and the next preset adjustment time instant, and the advance adjustment time instant is calculated based on the advance time interval and one of the previous preset adjustment time instant and the next preset adjustment time instant.

In an example, the advance time interval may be calculated through the following equation:

$$\Delta t = k(t2 - t1).$$

In the equation, t2 represents the next preset adjustment time instant, and t1 represents the previous preset adjustment time instant, $\Delta t$ represents the advance time interval, and k represents an adjustment coefficient which may be set based on an actual situation.

In an embodiment, t1 and t2 are known, and $\Delta t$ may be calculated based on a value of k set by a technician. Then, a time instant calculated as t1+$\Delta t$ is determined as the advance adjustment time instant, or a time instant calculated as t2−$\Delta t$ is determined as the advance adjustment time instant.

Figure 8:
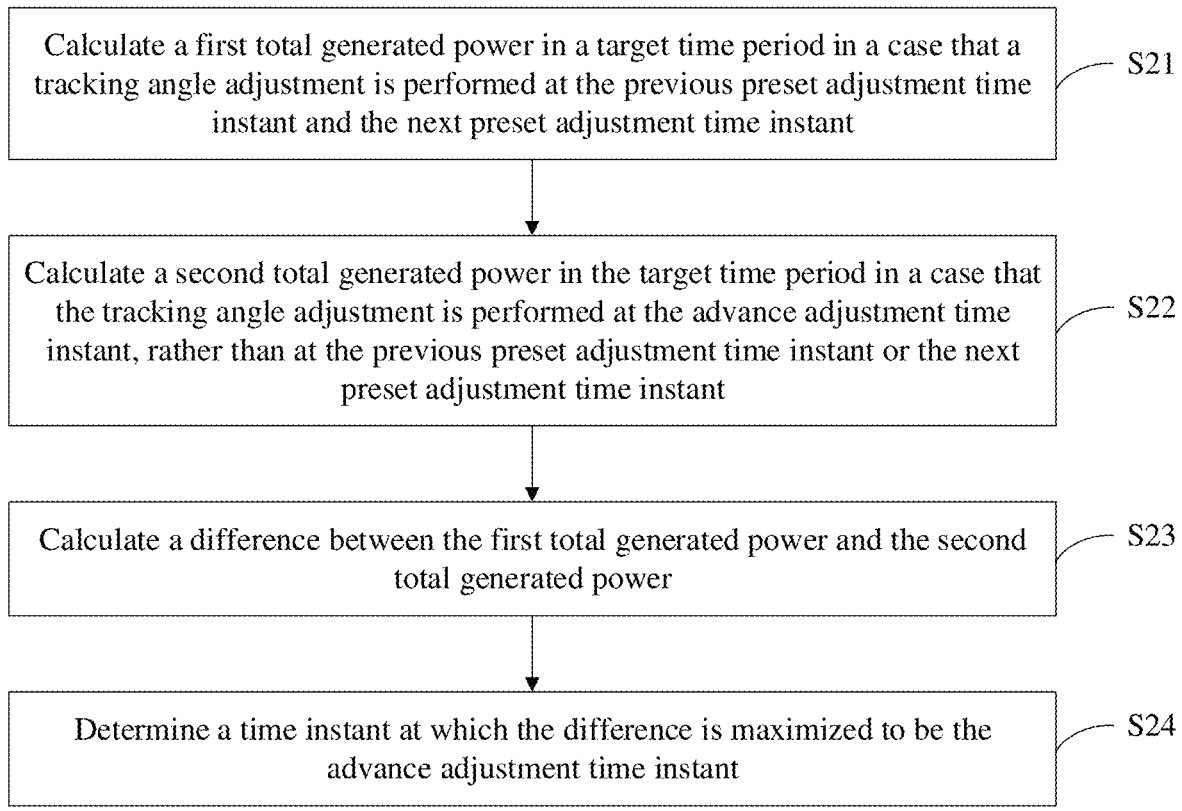
FIG. 8 is a flowchart of a photovoltaic tracking method according to another embodiment of the present disclosure.

In a fourth solution, referring to FIG. 8, step S11 includes steps S21 to S24.

In step S21, a first total generated power in a target time period is calculated in a case that a tracking angle adjustment is performed at the previous preset adjustment time instant and the next preset adjustment time instant.

The target time period is a time period from the previous preset adjustment time instant to the next preset adjustment time instant.

It should be noted that this step is to calculate the W1 in the above-mentioned equation. Reference may be made to the above illustration for a specific implementation thereof.

In step S22, a second total generated power in the target time period is calculated in a case that the tracking angle adjustment is performed at the advance adjustment time instant, rather than at the previous preset adjustment time instant or the next preset adjustment time instant.

It should be noted that this step is to calculate the W2 in the above-mentioned equation. Reference may be made to the above illustration for a specific implementation thereof. In the equation, t2' is encompassed in W2.

In step S23, a difference between the first total generated power and the second total generated power is calculated.

In an embodiment, the difference is represented as $\Delta W$. Reference may be made to the above illustration for a specific implementation thereof.

In step S24, a time instant at which the difference is maximized is determined to be the advance adjustment time instant.

In an implementation, $\Delta W$ at any time instant in a case that t2' is between t1 and t2 is calculated, and a time instant corresponding to the maximum $\Delta W$ is determined to be the advance adjustment time instant in the embodiment.

In step S12, a target tracking angle of the tracking bracket corresponding the next preset adjustment time instant is obtained.

In an embodiment, the tracking controller pre-calculates a correlation between the preset adjustment time instant and the tracking angle of the tracking bracket, such as 09.00 corresponding to a tracking angle 1, 09.10 corresponding to a tracking angle 2, 09.20 corresponding to a tracking angle 3, and the like.

Thus, the correlation is obtained, and the tracking angle corresponding to the next preset adjustment time instant is determined, from the correlation, as the target tracking angle.

In step S13, the angle of the tracking bracket is adjusted to the target tracking angle in a case that a current time instant is the advance adjustment time instant.

In practice, the tracking controller may output, to an actuator, an angle adjustment instruction including the target tracking angle, and the actuator adjusts the angle of the tracking bracket to the target tracking angle.

It should be noted that no adjustment is performed on the angle of the tracking bracket at the previous preset adjustment time instant or the next preset adjustment time instant. That is, in the present disclosure, no adjustment is performed on the angle of the tracking bracket at the time instants t1 or t2, but the angle of the tracking bracket is adjusted at time instants t2' and t3'. Thereby, the total number of adjustments is not changed, which avoids an increase of cost and reduce of reliability of the photovoltaic tracking system.

According to the embodiment of the present disclosure, the tracking controller does not adjust the angle of the tracking bracket at the previous preset adjustment time instant and the next preset adjustment time instant, but rather, adjusts the angle of the tracking bracket, at the advance adjustment time instant between the previous preset adjustment time instant and the next preset adjustment time instant, to the target tracking angle of the tracking bracket corresponding to the next preset adjustment time instant. Hence, during the time period from the previous preset adjustment time instant to the next preset adjustment time instant, a degree of sudden change in the power generation of the photovoltaic module is reduced, and continuity of the change in power generation is improved. Compared to adjusting the tracking angle at each preset adjustment time instant to cause the sudden change in the power generation of the photovoltaic module, the method of the present disclosure can increase the power generation of the photovoltaic module in the time period from the previous preset adjustment time instant to the next preset adjustment time instant, thereby reducing the power loss of the photovoltaic power generation.

In addition, the method according to the embodiment of the present disclosure is simple, requiring no further data collection but merely adjusting a tracking timing, which is a simple operation.

Figure 9:
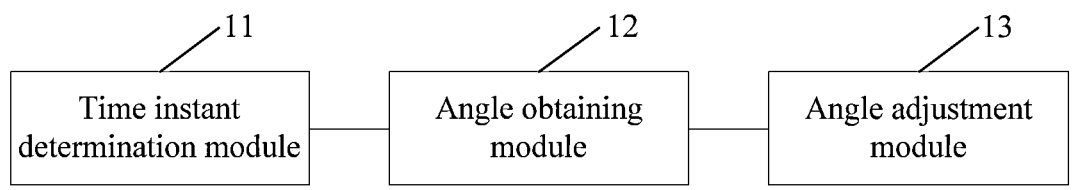
FIG. 9 is a schematic structural diagram of a photovoltaic tracking apparatus according to an embodiment of the present disclosure.

Alternatively, based on the method according to the above embodiment, a photovoltaic tracking apparatus is provided according to another embodiment of the present disclosure. The apparatus is applied to a tracking controller. Referring to FIG. 9, the apparatus includes a time instant determination module 11, an angle obtaining module 12 and an angle adjustment module 13.

The time instant determination module 11 is configured to determine an advance adjustment time instant between a previous preset adjustment time instant and a next preset adjustment time instant.

The angle obtaining module 12 is configured to obtain a target tracking angle of a tracking bracket corresponding to the next preset adjustment time instant.

The angle adjustment module 13 is configured to adjust the angle of the tracking bracket to the target tracking angle in a case that a current time instant is the advance adjustment time instant, where the angle of the tracking bracket remains unadjusted at the previous preset adjustment time instant and the next preset adjustment time instant.

In an embodiment, the time instant determination module 11 includes a first calculation sub-module, a second calculation sub-module, a third calculation sub-module and a time instant determination sub-module.

The first calculation sub-module is configured to calculate a first total generated power in a target time period in a case that a tracking angle adjustment is performed at the previous preset adjustment time instant and the next preset adjustment time instant, where the target time period is a time period from the previous preset adjustment time instant and the next preset adjustment time instant.

The second calculation sub-module is configured to calculate a second total generated power in the target time period in a case that the tracking angle adjustment is performed at the advance adjustment time instant, rather than at the previous preset adjustment time instant or the next preset adjustment time instant.

The third calculation sub-module is configured to calculate a difference between the first total generated power and the second total generated power.

The time instant determination sub-module is configured to determine a time instant at which the difference is maximized to be the advance adjustment time instant.

In an embodiment, the time instant determination module 11 is specifically configured to: randomly select a time instant between the previous preset adjustment time instant and the next preset adjustment time instant; and determine the selected time instant to be the advance adjustment time instant.

In an embodiment, the time instant determination module 11 is specifically configured to determine an intermediate time instant between the previous preset adjustment time instant and the next preset adjustment time instant to be the advance adjustment time instant.

In an embodiment, the time instant determination module 11 is specifically configured to: determine an advance time interval based on the previous preset adjustment time instant and the next preset adjustment time instant; and calculate the advance adjustment time instant based on the advance time interval and one of the previous preset adjustment time instant and the next preset adjustment time instant.

In an embodiment, the time instant determination module 11 is specifically configured to: obtain a tracking mode of a photovoltaic tracking system and the current time instant; and in a case that the tracking mode is a normal tracking mode and the current time instant is within a preset time period, when determining that the current time instant is between the previous preset adjustment time instant and the next preset adjustment time instant, determine the current time instant between the previous preset adjustment time instant and the next preset adjustment time instant to be the advance adjustment time instant.

In an embodiment, the angle obtaining module 12 is specifically configured to: obtain a predetermined correlation between a preset adjustment time instant and a tracking angle of the tracking bracket; query, from the predetermined correlation, a tracking angle corresponding to the next preset adjustment time instant; and determine said tracking angle to be the target tracking angle.

In an embodiment, the angle obtaining module 13 is specifically configured to: output an angle adjustment instruction comprising the target tracking angle to an actuator; and controlling the actuator to adjust the angle of the tracking bracket to the target tracking angle.

According to the embodiment of the present disclosure, the tracking controller does not adjust the angle of the tracking bracket at the previous preset adjustment time instant and the next preset adjustment time instant, but rather, adjusts the angle of the tracking bracket, at the advance adjustment time instant between the previous preset adjustment time instant and the next preset adjustment time instant, to the target tracking angle of the tracking bracket corresponding to the next preset adjustment time instant. Hence, during the time period from the previous preset adjustment time instant to the next preset adjustment time instant, a degree of sudden change in the power generation of the photovoltaic module is reduced, and continuity of the change in power generation is improved. Compared to adjusting the tracking angle at each preset adjustment time instant to cause the sudden change in the power generation of the photovoltaic module, the method of the present disclosure can increase the power generation of the photovoltaic module in the time period from the previous preset adjustment time instant to the next preset adjustment time instant, thereby reducing the power loss of the photovoltaic power generation.

It should be noted that reference may be made to the above embodiments for working processes of the modules and sub-modules in the embodiment, which are not repeated here.

Alternatively, based on the method and the apparatus according to the above embodiments, a tracking controller is provided according to another embodiment of the present disclosure. The tracking controller includes a memory and a processor. The memory is configured to store a program. The processor is configured to call the program and perform the photovoltaic tracking method.

Alternatively, based on the tracking controller according to the above embodiment, a photovoltaic tracking system is provided according to another embodiment of the present disclosure. The photovoltaic tracking system includes at least one photovoltaic module, a photovoltaic inverter and the tracking controller.

The tracking controller is mechanically connected to the at least one photovoltaic module, and the at least one photovoltaic module is connected to a direct current side of the photovoltaic inverter.

It should be noted that, reference may be made to the above embodiments for a specific structure of the photovoltaic tracking system in the embodiment, which is not repeated here.

According to the embodiment of the present disclosure, the tracking controller does not adjust the angle of the tracking bracket at the previous preset adjustment time instant and the next preset adjustment time instant, but rather, adjusts the angle of the tracking bracket, at the advance adjustment time instant between the previous preset adjustment time instant and the next preset adjustment time instant, to the target tracking angle of the tracking bracket corresponding to the next preset adjustment time instant. Hence, during the time period from the previous preset adjustment time instant to the next preset adjustment time instant, a degree of sudden change in the power generation of the photovoltaic module is reduced, and continuity of the change in power generation is improved. Compared to adjusting the tracking angle at each preset adjustment time instant to cause the sudden change in the power generation of the photovoltaic module, the method of the present disclosure can increase the power generation of the photovoltaic module in the time period from the previous preset adjustment time instant to the next preset adjustment time instant, thereby reducing the power loss of the photovoltaic power generation.

The above description of the disclosed embodiments enables those skilled in the art to implement or use the present disclosure. Various modifications to the embodiments are apparent to those skilled in the art, and the generic principles defined herein may be practiced in other embodiments without departing from the spirit or scope of the present disclosure. Therefore, the present disclosure is not to be limited to the embodiments shown herein but is to be conformed with the widest scope consistent with the principles and novel features disclosed herein.

The invention claimed is:

1. A photovoltaic tracking method, applied to a tracking controller, comprising:
    determining an advance adjustment time instant between a previous preset adjustment time instant and a next preset adjustment time instant;
    obtaining a target tracking angle of a tracking bracket corresponding to the next preset adjustment time instant; and
    adjusting an angle of the tracking bracket to the target tracking angle in a case that a current time instant is the advance adjustment time instant, wherein the angle of the tracking bracket remains unadjusted at the previous preset adjustment time instant and the next preset adjustment time instant,
    wherein the determining an advance adjustment time instant between a previous preset adjustment time instant and a next preset adjustment time instant comprises:
        calculating a first total generated power in a target time period in a case that a tracking angle adjustment is performed at the previous preset adjustment time instant and the next preset adjustment time instant, respectively, wherein the target time period is a time period from the previous preset adjustment time instant to the next preset adjustment time instant;
        calculating a second total generated power in the target time period in a case that the tracking angle adjustment is performed at the advance adjustment time instant, rather than at the previous preset adjustment time instant or the next preset adjustment time instant;
        calculating a difference between the first total generated power and the second total generated power; and
        determining a time instant at which the difference is maximized to be the advance adjustment time instant.

2. The method according to claim 1, wherein the determining an advance adjustment time instant between a previous preset adjustment time instant and a next preset adjustment time instant comprises:
    randomly selecting a time instant between the previous preset adjustment time instant and the next preset adjustment time instant; and
    determining the selected time instant to be the advance adjustment time instant.

3. The method according to claim 1, wherein the determining an advance adjustment time instant between a previous preset adjustment time instant and a next preset adjustment time instant comprises:
    determining an intermediate time instant between the previous preset adjustment time instant and the next preset adjustment time instant to be the advance adjustment time instant.

4. The method according to claim 1, wherein the determining an advance adjustment time instant between a previous preset adjustment time instant and a next preset adjustment time instant comprises:
    determining an advance time interval based on the previous preset adjustment time instant and the next preset adjustment time instant; and
    calculating the advance adjustment time instant based on the advance time interval and one of the previous preset adjustment time instant and the next preset adjustment time instant.

5. The method according to claim 1, wherein the determining an advance adjustment time instant between a previous preset adjustment time instant and a next preset adjustment time instant comprises:
    obtaining a tracking mode of a photovoltaic tracking system and the current time instant; and
    in a case that the tracking mode is a normal tracking mode and the current time instant is within a preset time period, when determining that the current time instant is between the previous preset adjustment time instant and the next preset adjustment time instant, determining the current time instant between the previous preset adjustment time instant and the next preset adjustment time instant to be the advance adjustment time instant.

6. The method according to claim 1, wherein the obtaining a target tracking angle of a tracking bracket corresponding to the next preset adjustment time instant comprises:
obtaining a predetermined correlation between a preset adjustment time instant and a tracking angle of the tracking bracket;
querying, from the predetermined correlation, a tracking angle corresponding to the next preset adjustment time instant; and
determining said tracking angle to be the target tracking angle.

7. The method according to claim 1, wherein the adjusting the angle of the tracking bracket to the target tracking angle comprises:
outputting an angle adjustment instruction comprising the target tracking angle to an actuator; and
controlling the actuator to adjust the angle of the tracking bracket to the target tracking angle.

8. A photovoltaic tracking apparatus, applied to a tracking controller, wherein the apparatus comprises:
a time instant determination module, configured to determine an advance adjustment time instant between a previous preset adjustment time instant and a next preset adjustment time instant;
an angle obtaining module, configured to obtain a target tracking angle of a tracking bracket corresponding to the next preset adjustment time instant; and
an angle adjustment module, configured to adjust an angle of the tracking bracket to the target tracking angle in a case that a current time instant is the advance adjustment time instant;
wherein the angle of the tracking bracket remains unadjusted at the previous preset adjustment time instant and the next preset adjustment time instant;
wherein the time instant determination module is further configured to:
calculate a first total generated power in a target time period in a case that a tracking angle adjustment is performed at the previous preset adjustment time instant and the next preset adjustment time instant, respectively, wherein the target time period is a time period from the previous preset adjustment time instant to the next preset adjustment time instant;
calculate a second total generated power in the target time period in a case that the tracking angle adjustment is performed at the advance adjustment time instant, rather than at the previous preset adjustment time instant or the next preset adjustment time instant;
calculate a difference between the first total generated power and the second total generated power; and
determine a time instant at which the difference is maximized to be the advance adjustment time instant.

9. A tracking controller, comprising a memory and a processor; wherein
the memory is configured to store a program; and
the processor is configured to call the program and perform a photovoltaic tracking method;
wherein the method comprises:
determining an advance adjustment time instant between a previous preset adjustment time instant and a next preset adjustment time instant;
obtaining a target tracking angle of a tracking bracket corresponding to the next preset adjustment time instant; and
adjusting an angle of the tracking bracket to the target tracking angle in a case that a current time instant is the advance adjustment time instant, wherein the angle of the tracking bracket remains unadjusted at the previous preset adjustment time instant and the next preset adjustment time instant;
wherein the determining an advance adjustment time instant between a previous preset adjustment time instant and a next preset adjustment time instant comprises:
calculating a first total generated power in a target time period in a case that a tracking angle adjustment is performed at the previous preset adjustment time instant and the next preset adjustment time instant, respectively, wherein the target time period is a time period from the previous preset adjustment time instant to the next preset adjustment time instant;
calculating a second total generated power in the target time period in a case that the tracking angle adjustment is performed at the advance adjustment time instant, rather than at the previous preset adjustment time instant or the next preset adjustment time instant;
calculating a difference between the first total generated power and the second total generated power; and
determining a time instant at which the difference is maximized to be the advance adjustment time instant.

10. A photovoltaic tracking system, comprising:
at least one photovoltaic module;
a photovoltaic inverter; and
the tracking controller according to claim 9;
wherein the tracking controller is mechanically connected to the at least one photovoltaic module, and the at least one photovoltaic module is connected to a direct current side of the photovoltaic inverter.

* * * * *